S. B. TILY & M. O. & J. G. REHFUSS.
DATING AND MUTILATING MACHINE.
APPLICATION FILED JAN. 26, 1915.
1,269,979.
Patented June 18, 1918.
5 SHEETS—SHEET 1.
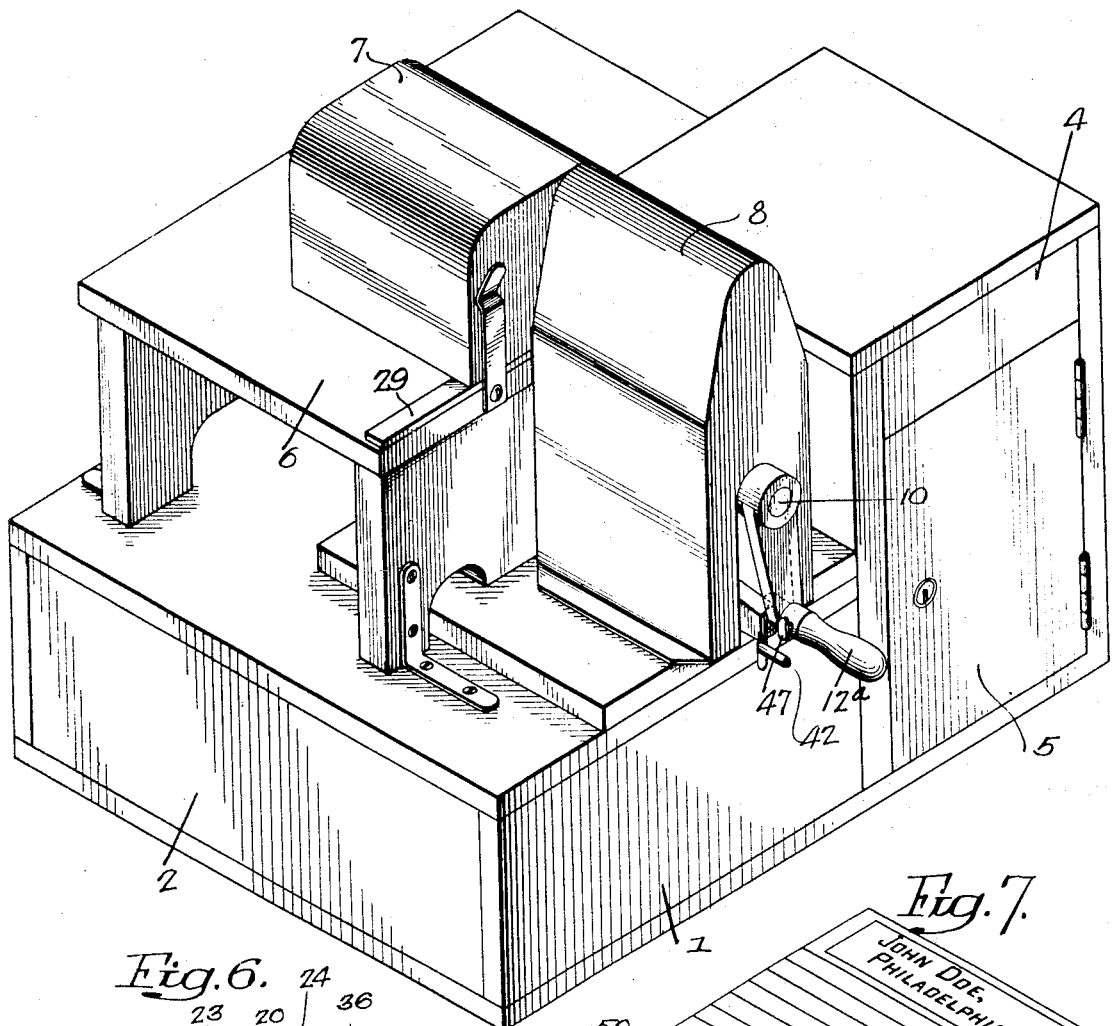
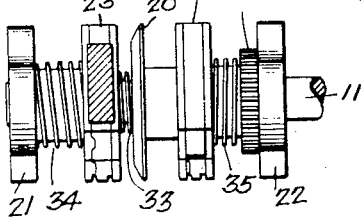
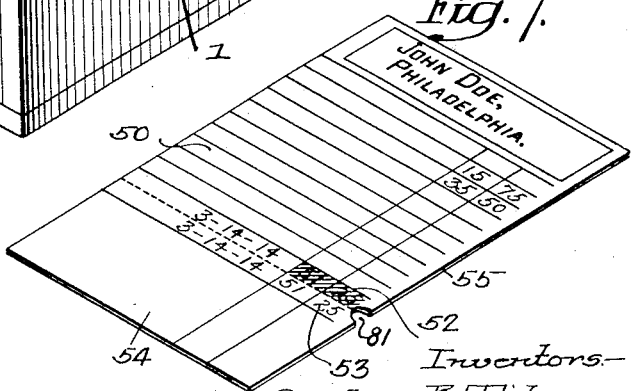

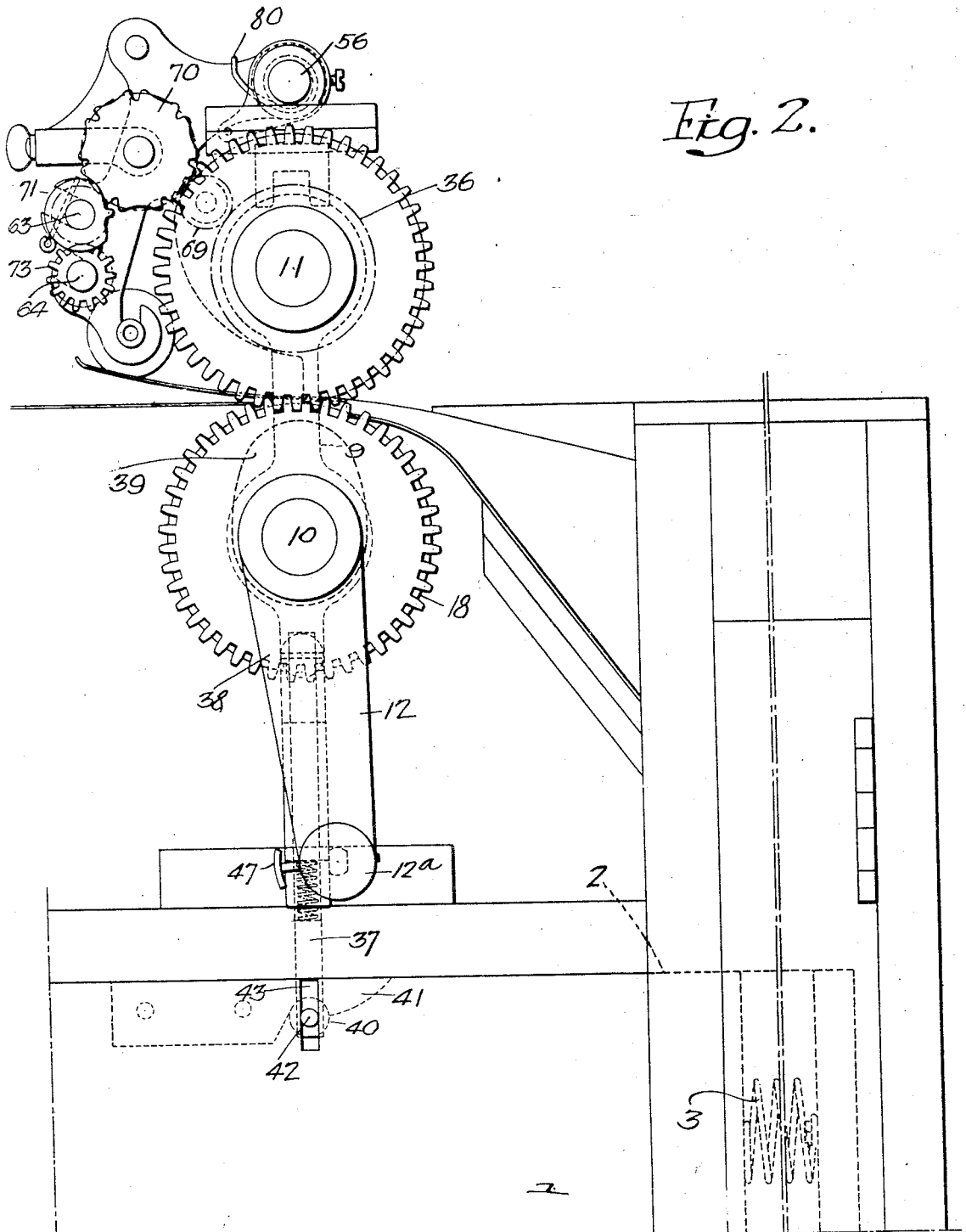

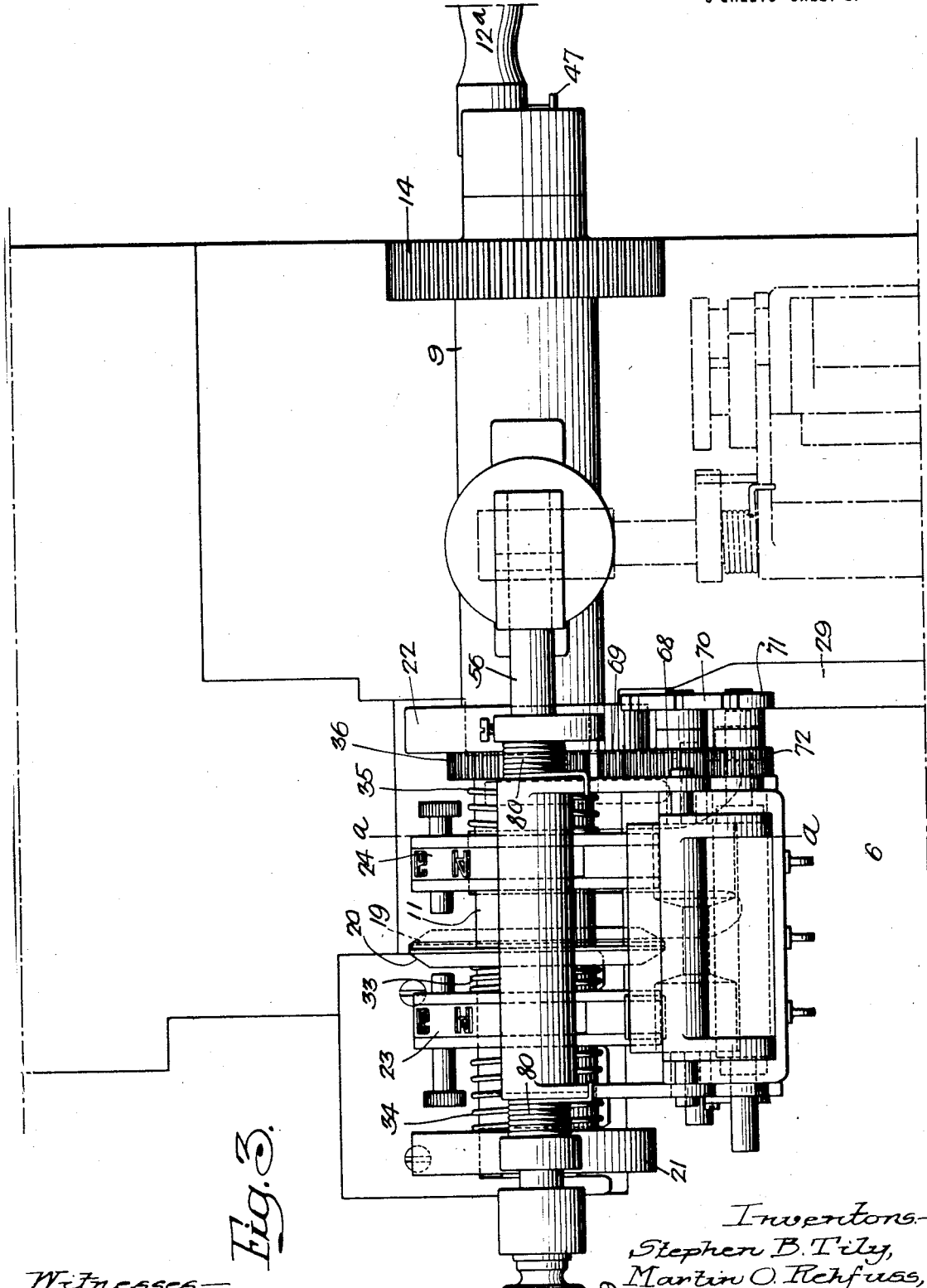

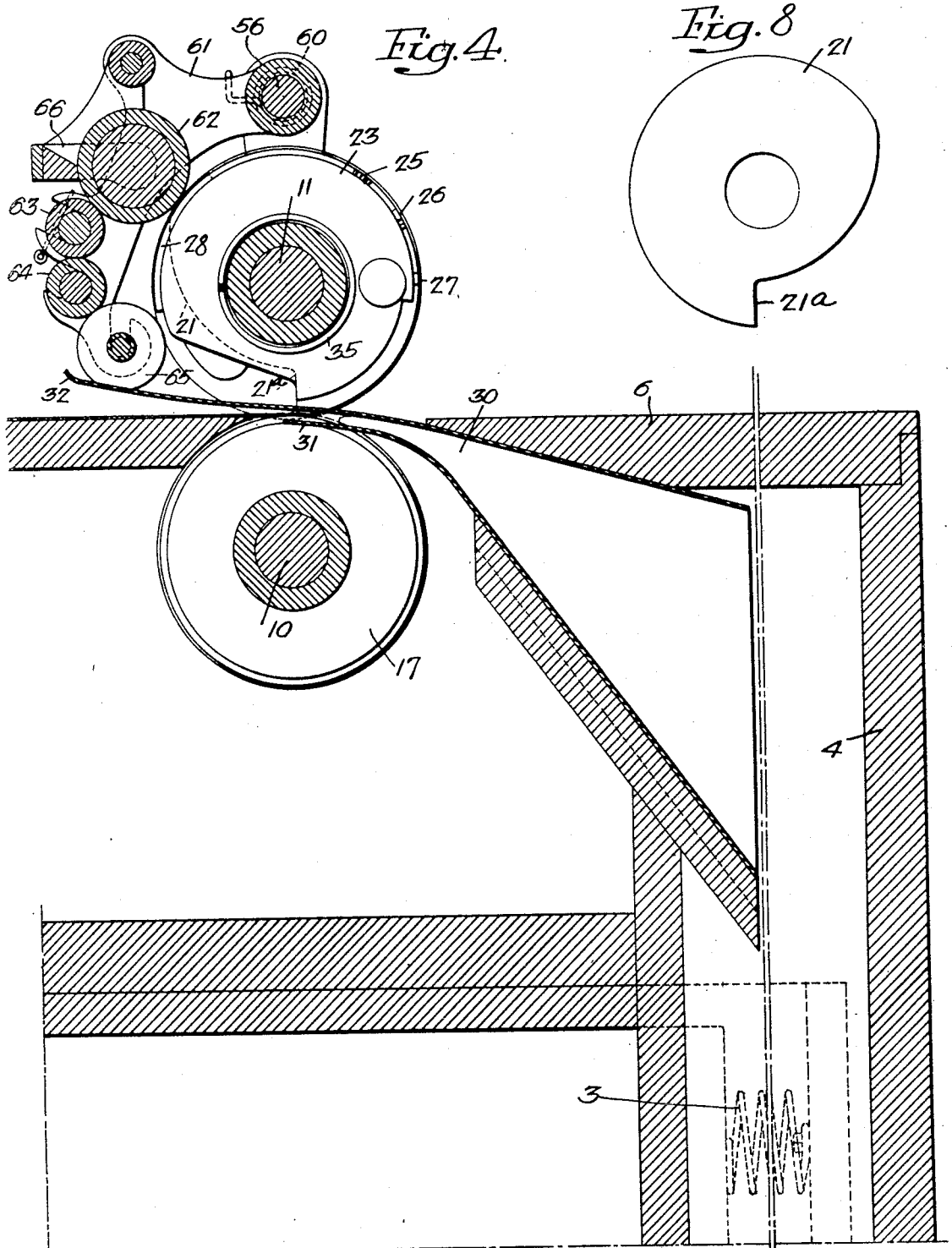

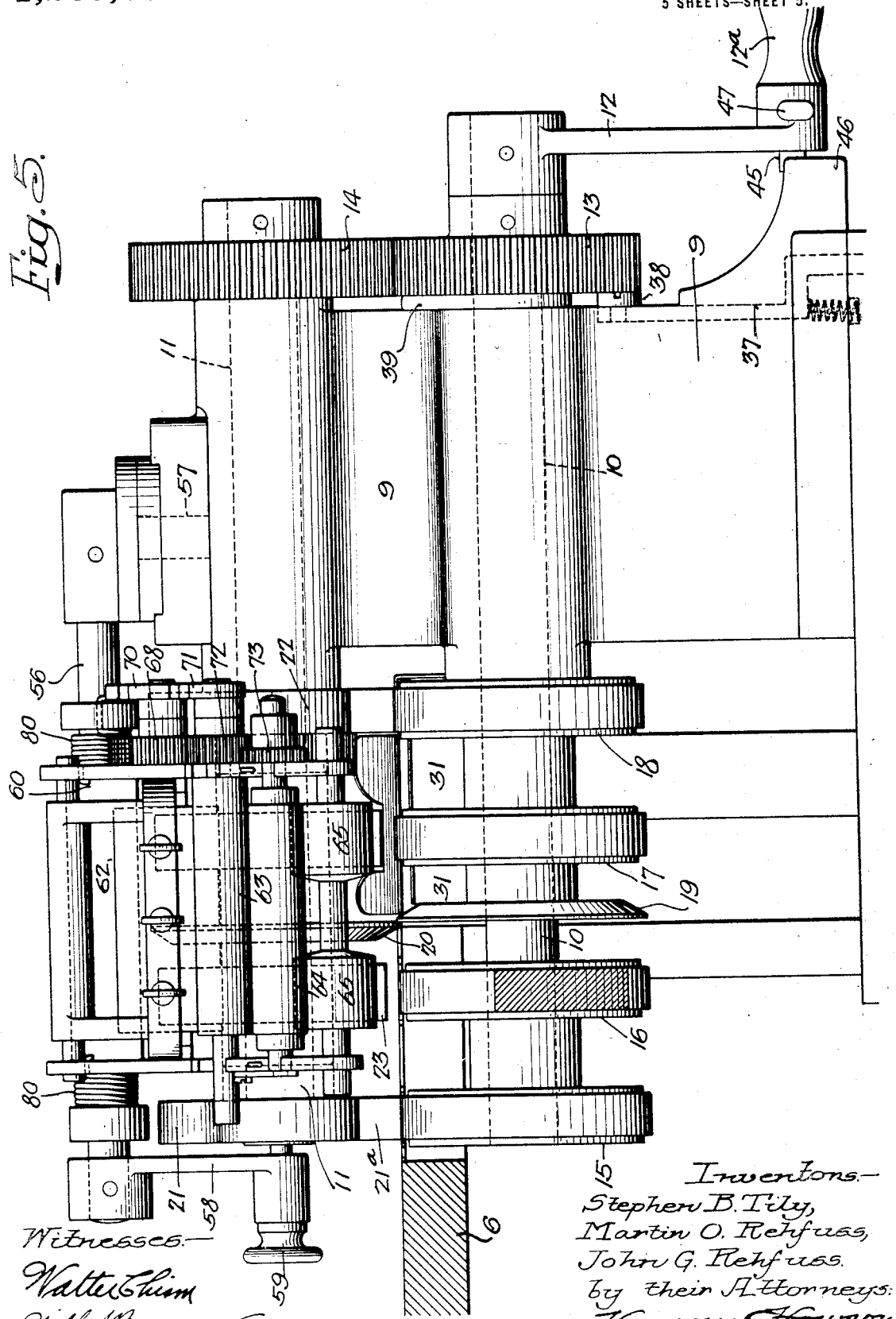

UNITED STATES PATENT OFFICE.

STEPHEN B. TILY, OF BALA, AND MARTIN O. REHFUSS AND JOHN G. REHFUSS, OF PHILADELPHIA, PENNSYLVANIA, ASSIGNORS TO JOHN WANAMAKER, PHILADELPHIA, OF PHILADELPHIA, PENNSYLVANIA, A CORPORATION OF PENNSYLVANIA.

DATING AND MUTILATING MACHINE.

1,269,979.   Specification of Letters Patent.   Patented June 18, 1918.

Application filed January 26, 1915. Serial No. 4,492.

*To all whom it may concern:*

Be it known that we, STEPHEN B. TILY, MARTIN O. REHFUSS, and JOHN G. REHFUSS, citizens of the United States, I, the said STEPHEN B. TILY, being a resident of Bala, Montgomery county, State of Pennsylvania, and we, the said MARTIN O. REHFUSS and JOHN G. REHFUSS, being residents of Philadelphia, county of Philadelphia, State of Pennsylvania, have invented certain Improvements in Dating and Mutilating Machines, of which the following is a specification.

One object of our invention is to provide mechanism which in addition to severing from a sales schedule the portion containing any desired data such as the date and a duplicate record of the amount of the sale entered on the main part thereof, shall so mutilate that part of the body or main portion of the schedule on which the record of the sale has been made as to render any attempt to alter the same easy of detection.

A further object of the invention is to provide novel means for receiving and feeding a schedule in order to accomplish the above objects, together with a novel arrangement of parts for cutting off and preserving the part severed from the main portion of said schedule.

The invention also contemplates the provision of a novel form of mutilating and dating mechanism which shall be relatively simple and substantial in construction and have its parts so arranged as to require but a minimum of attention and repairs.

These objects and other advantageous ends we secure as hereinafter set forth, reference being had to the accompanying drawings, in which, Figure 1 is a perspective view of the machine constituting our invention;

Figs. 2 and 3 are respectively a side elevation and a plan illustrating on an enlarged scale the mechanism constituting the main part of our invention;

Fig. 4 is a vertical section on the line *a—a*, Fig. 3;

Fig. 5 is a front elevation partly in section, of the mechanism shown in Fig. 2;

Fig. 6 is an elevation on a somewhat reduced scale illustrating the construction of the members on the main shaft;

Fig. 7 is a perspective view of one of the sales slips or schedules on which the machine is designed to operate, and Fig. 8 is a side elevation of one of the upper feeding members.

In the above drawings 1 represents a casing or supporting structure in which is slidably mounted a drawer 2, at all times pressed outwardly by a spring 3 confined between its rear end and the rear wall of said casing. At the back of the drawer containing casing is a receptacle 4 having a normally locked door 5 and designed for the reception of pieces severed from the sales slips or schedules as hereafter described.

On the top of the casing 1 and in front of the receptacle 4 is mounted the operating mechanism of our invention which has extending horizontally adjacent its middle part the receiving platform 6. Said mechanism is for the most part inclosed by two sheet metal covers 7 and 8 of which the first has its lower edges spaced a short distance above the top surface of the platform 6 to permit of the introduction of the sales slips.

As shown in Fig. 5, the operating mechanism is carried by a standard 9 projecting upwardly from the top of the casing 1 and having bearings for the reception of two horizontal shafts 10 and 11 of which the first has fixed to it an operating handle or crank 12 and a gear 13, the latter meshing with a second gear 14 on the shaft 11 on the outer side of the standard 9. On the inner side of said standard the shaft 10 has fixed to it four feeding wheels 15 and 16, 17 and 18 all preferably provided with a rubber or other gripping face, designed to hold and feed a paper or paste-board card or slip so as to prevent slipping thereof. All of these wheels or nip rolls are substantially of the same diameter and the shaft 10 is so mounted that they are substantially tangent with the upper surface of the platform 6. Between the wheels 16 and 17 is mounted a cutting disk 19 also fixed to the shaft 10.

On the shaft 11 there is also fixed a cutting disk 20 so placed as to coöperate with the disk 19 to cut a sales slip moved over the platform 6 by the feed wheels and there are also fixed to said shaft two feed wheels 21 and 22 so placed as to respectively coöperate with the feed wheels 15 and 18, it being noted however, (Fig. 8), that each of these, while being for the most part of circular outline, is cut away so as to be cam shaped in order that it may engage its corresponding lower feed wheel for a part only of its revolution. The shaft 11 has also fixed to it two dating wheels 23 and 24 respectively mounted between the feed wheels 21 and 22 and the cutting disk 20, and these, as shown in Fig. 4, each has type 25, 26 and 27 projecting from its periphery for printing the date upon a schedule, it being noted that the diameter of these dating wheels is such that the printing face of the above noted type constitutes the only portion of said wheels capable of engaging a sales slip operated on, with the exception that in the case of the wheel 23 there is also mounted on its periphery a mutilating die 28 formed of a body of steel having relatively sharp inclined cutting ribs upon its circularly curved surface, although obviously its cutting or mutilating portions may have any other suitable form, as will be understood by those skilled in the art.

As shown in Fig. 3 there is mounted upon the platform 6 at the side nearest the standard 9, a guide strip 29 extending from the front toward the rear thereof and having its inner edge in a vertical plane coincident with or immediately adjacent the plane of the outer face of the feed wheel 22, said platform 6, immediately to the rear of the above described mechanism, having an opening into which projects the upper end of a chute 30 leading to the interior of the receptacle 4. The lower edge of the mouth of this chute includes two fingers 31 extending respectively between the lower feed wheel 17 and the feed wheel 18 and the cutting disk 19, it being noted that the width of the chute is slightly greater than the distance between the outside of the feed wheel 22 and the outer side of the upper cutting disk 20. The upper edge of the chute has two forwardly projecting portions in the shape of fingers 32 extending slightly above the top surface of the platform 6 to a point well in front of the cutting and printing mechanism, the ends of said fingers being slightly upturned so as to facilitate the insertion of a sales slip. The upper cutting disk 20 is at all times pressed toward the lower disk 19 by a spring 33 mounted on the shaft 11 between it and the dating wheel 23 and there is a second spring 34 likewise coiled upon the shaft 11 between this dating wheel and the feed wheel 21. Another coil spring 35 is mounted between the second dating wheel 24 and a gear wheel 36 fixed to said shaft immediately adjacent the feed wheel 22, which with the spring 34 is designed to hold in place the removable side plates of the two dating wheels whereby access may be had to the date type for the purpose of changing the same.

The drawer is normally maintained in its closed position in the casing 1 against the action of the spring 3 by a spring pressed latch 37 vertically guided in a suitable channel in the standard 9 and carrying at its upper end a roller 38 designed to be engaged by a cam 39 on the shaft 10 so as to force down said latch against the action of its spring. The lower end of this latch carries a second roller 40 designed to engage a hook 41 on the drawer 2, and has a pin or bar 42 projecting through a slot 43 in the side of the casing 1 whereby it may be depressed independently of the cam 39. The operating crank 12 has in the inner end of its handle 12$^a$ a projecting latch 45 designed to engage a lug 46 on the standard 9 and so connected to a push button 47 on said handle as to be drawn in, clear of the lug, when said button is depressed by the thumb of the operator.

When the parts are in position ready for use the crank handle 12 extends vertically downward from the shaft 10 with its latch 45 engaging the lug 46 while the two feed wheels 21 and 22 are so placed upon the shaft 11 that their radial abutments 21$^a$ are in a substantially vertical plane immediately adjacent the lower feed wheels 15 and 18. The sales slips designed for use with our machine preferably have the form indicated at 50, (Fig. 7) and consist of a body portion 51 upon which is made the full record of a sale, including figures indicating the total cash amount of the same, placed within a definite space 52 outlined on the slip. The lower end of said slip is printed with a similar space 53 in which a duplicate entry is made of the amount of the sale and upon both the body and the bottom portion of the slip may be placed any suitable numbers or characters denoting the sales person by whom it was issued, the slip number or any other desired material or facts. The positions of the two spaces 52 and 53 is such that when the sales slip is placed upon the platform 6 with its bottom edge 54 in engagement with the guide strip 29 and is pushed inwardly until its side 55 engages the radial portions 21$^a$ of the feed wheels 21 and 22 it will not be engaged by the cutting disks 20 and 19 since all the sales slips are notched in one edge as indicated at 81 midway between said two spaces.

If now, the push button 47 be pressed inwardly the latch 45 is withdrawn from behind the abutment 46, thus freeing the operating crank 12 which is given a complete revolution. The shaft 10 is thus turned as is also the shaft 11 through the gears 13 and 14, and while the sales slip is not gripped by any of the feed wheels, it is fed toward the rear of the machine after the crank has been turned through a short distance by the drawing in action of the mutilating die 28 on the dating wheel 23 which comes into engagement with that portion of the body of the slip constituting the inclosed space 52, and this die, coacting with the surface of the feed wheel 16, so cuts or mutilates said slip immediately over and surrounding the sales record as to make it an impossibility for it to be in any way altered or erased without so changing the appearance of the paper as to render such alteration easily detectable. Just before the mutilating die ceases to operate upon the sales slip, the continued revolution of the crank handle causes it to be gripped between the two pairs of feed wheels 21—15 and 22—18, which thereafter forcibly move it toward the rear while it is passing between the dating type 25, 26 and 27 and the two lower feed wheels 16 and 17. The body of the slip is finally released by the two feed wheels 15 and 21 just after its lower portion has been completely severed by the cutting disks 19 and 20 and delivered into the chute 30, from whence it passes downwardly into the receptacle 4. The dating type 25, 26 and 27 are so placed on the two feed wheels 23 and 24 as to make duplicate records of the date upon the bottom of the body of the sales slip and upon the top of the severed portion thereof, it being understood that while the body or main portion of the sales slip is given to the customer or inclosed with his purchase, the severed end is retained in the machine for future reference.

If desired, ink may be applied to the face of the mutilating die and to the dating type by the mechanism shown, which is operated from the gear 36 on the upper shaft 11. For this purpose we connect a horizontal bar 56 to the top of the standard 9 by a vertical pivot 57, and extend it over the shaft 11, mounting upon its outer end a downwardly extending arm 58 which carries in its end a headed pin 59 designed to enter a hole centrally placed in the end of said shaft so that said arm 56 is rigidly held in place. Upon this latter we hinge an inking carriage consisting of a frame having a fountain and ink distributing rollers. This frame is formed of a sleeve 60 rotatable upon the arm 56 and having side members 61 projecting forwardly from its ends. Mounted on suitable spindles extending between these side members are a fountain roller 62, two distributing rollers 63 and 64, and a pair of delivery rollers 65 so placed as to respectively engage the surfaces of the type 25, 26 and 27 on the dating wheels 23 and 24. A fountain 66 is likewise mounted between and supported by said side frame members in such position as to deliver ink to the roller 62.

For actuating these rollers we loosely mount a gear 68 on the spindle of the fountain roller 62 and operatively connect it with the gear 36 through an idler pinion 69 carried by one of said frame members 61. The roller 62 has fixed to it one member 70 of a Geneva gear whose second member 71 is fixed to the spindle of the roller 63, which also has fixed to it a gear 72 meshing with a second gear 73 fixed to the spindle of the distributing roller 64.

With this arrangement of parts the revolution of the shaft 11 through the idler pinion 69 turns the loose gear 68 and through it also rotates the two gears 72 and 73. Once in each revolution of the gear 72 the member 71 of the Geneva gear is likewise turned and is thereby caused to give a partial revolution to the member 70 as well as to the fountain roller 62 to which it is fixed. Ink is thus delivered from the fountain to the rollers 65 and thence to the dating type and mutilating die, which consequently not only impresses or cuts into the paper of the sales slip, but at the same time applies ink to the body and edges of the impressed portions of the same so as to still further prevent the possibility of alteration of the records made.

Each revolution of the crank handle 12 through the cam 39 forces downwardly the roller 38 together with the latch 37, thus causing the roller 40 to release the hook 41 and allow the drawer 2 to move into its open position under the action of the spring 3. Immediately after forcing the latch downwardly the cam 39 releases the same so that when the drawer is later moved to its inner position, its hook is engaged by the roller 40 which again occupies its upper position and it is thereby held closed.

Whenever desired the inking carriage may be swung upwardly on the arm 56 as a pivot, in order to give access to the under or back portions of the inking rollers and fountain, it being noted that springs 80 are mounted upon said arm so as to at all times press the carriage downwardly and cause its delivery rollers 65 to yieldingly engage the type and mutilating die of the dating wheels. In addition whenever desired, the headed pin 59 may be drawn outwardly from engagement with the end of the shaft 11 and thus permit the arm 56 being swung forward through an angle of 90° into the position shown in dotted lines in Fig. 3 in order to allow of inspection of the members carried by the shaft 11 or a change of the type.

It is particularly to be noted that the machine is caused to invariably mutilate that portion of the body of the sales slip upon which the main record of the amount of a sale has been made, by virtue of the fact that said slip is moved into the machine until its side edge engages the abutments formed by the radial portions 21ª of the feed wheels 21 while its bottom end engages the guide strip 29. This positioning of the slip is made possible by reason of the notch 81 which is so placed in its side as to receive the edges of the cutting knives 19 and 20 and thereby allow said slip being moved rearwardly until it strikes the said radial portions or abutments 21ª which are in a line some distance to the rear of the point at which the cutting edges of said knives first engage each other.

We claim:—

1. The combination in a sales recording machine of a pair of substantially parallel shafts; two coacting feed wheels respectively mounted on said shafts; a chute opening to the rear of the feed wheels; two coöperating cutting members mounted at one side of the chute; and guide fingers extending from the opening of the chute forwardly on either side of the upper feed wheels in position to receive the ends of slips cut off by said members.

2. The combination in a sales recording machine of a pair of substantially parallel shafts; two coacting feed wheels respectively mounted on said shafts; a chute opening to the rear of the feed wheels; guide fingers extending from the opening of the chute forwardly on either side of the upper feed wheel; two coöperating cutting members mounted at one side of the chute; with guiding means on the opposite side of the chute for engaging the ends of sales slips.

3. The combination in a sales recording machine of two parallel shafts; a cutting disk and a plurality of substantially circular members mounted on one of the shafts; a plurality of feed wheels, a circularly curved mutilating die, and a second cutting disk fixed to the other shaft in position to respectively coact with the circular members and the cutting disk on the first shaft; a chute having a pair of forwardly projecting guide fingers extended on opposite sides of one of the feed wheels adjacent the coacting cutters; and a guide at that side of the chute opening distant from the cutters.

4. The combination in a mutilating machine of means for mutilating a predetermined part of a sales slip; a feed wheel having a slip-positioning abutment; and a device for cutting a portion from the body of a slip, the same having the forward part of its cutting edge in advance of the line of said abutment.

5. The combination in a mutilating machine of a movably mounted slip-limiting abutment; means for feeding and impressing a sales slip placed in engagement with said abutment; and a device for severing a portion of said slip from the body thereof, the same being mounted with its cutting edge intersecting the plane of the sales slip at a point in advance of the line of said abutment.

6. The combination in a mutilating machine of a slip supporting table; a feed wheel having an abutment for limiting the movement of a sales slip on said table; a pair of coacting cutting disks mounted with their most forward point of engagement immediately adjacent the plane of the table and in advance of the line of said abutment; means for actuating said feed wheel and cutting disks; and means for impressing the slip as it is passed through the machine.

7. The combination in a mutilating machine of a slip-supporting table; a pair of feed wheels each having a slip-limiting abutment; a pair of coacting cutting disks mounted with their most forward point of engagement immediately adjacent the plane of the table and in advance of a straight line between said abutments so as to be within the notch in the side of a sales slip whose straight side rests against the feed wheel abutments; means for actuating said feed wheels and cutting disks; and means for impressing the slip as it is passed through the machine.

In testimony whereof, we have signed our names to this specification, in the presence of two subscribing witnesses.

STEPHEN B. TILY.
MARTIN O. REHFUSS.
JOHN G. REHFUSS.

Witnesses:
WILLIAM E. BRADLEY,
WM. A. BARR.